US006657355B2

(12) United States Patent
Kiyose et al.

(10) Patent No.: US 6,657,355 B2
(45) Date of Patent: Dec. 2, 2003

(54) PLANE COMMUTATOR WITH METAL BASE PLATE AND CARBON COMPOUND SEGMENTS HAVING PROJECTIONS

(75) Inventors: Kenzo Kiyose, Takahama (JP); Yoshio Ebihara, Kariya (JP)

(73) Assignee: Denso Corporation, Kariya (JP)

( * ) Notice: Subject to any disclaimer, the term of this patent is extended or adjusted under 35 U.S.C. 154(b) by 72 days.

(21) Appl. No.: 09/799,624

(22) Filed: Mar. 7, 2001

(65) Prior Publication Data

US 2001/0024074 A1 Sep. 27, 2001

(30) Foreign Application Priority Data

Mar. 23, 2000 (JP) ....................................... 2000-081406

(51) Int. Cl.[7] ........................ H02K 13/04; H02K 13/00; H02K 15/02; H02K 39/06; H02K 39/32

(52) U.S. Cl. ........................ 310/237; 310/233; 310/235

(58) Field of Search ................................ 310/237, 233, 310/235; 29/597, 733

(56) References Cited

U.S. PATENT DOCUMENTS 5,157,299 A * 10/1992 Gerlach ....................... 310/237
5,189,329 A * 2/1993 Strobl ......................... 310/233
5,422,528 A * 6/1995 Prahl ........................... 29/597
5,629,576 A * 5/1997 Shimoyama ................ 310/235
5,637,944 A * 6/1997 Shimoyama ................ 310/237
5,679,996 A * 10/1997 Strobl ......................... 310/237
5,898,989 A * 5/1999 Strobl ......................... 29/597
5,912,523 A * 6/1999 Ziegler et al. .............. 310/237
5,925,961 A * 7/1999 Sugiyanma ................. 310/237
5,932,949 A * 8/1999 Ziegler et al. .............. 310/236
5,955,812 A * 9/1999 Warner ........................ 310/233
6,222,298 B1 * 4/2001 Saito et al. ................. 310/233
6,242,838 B1 * 6/2001 Kiyose et al. .............. 310/233
6,259,183 B1 * 7/2001 Hotta et al. ................. 310/233
6,359,362 B1 * 3/2002 Schmidt ...................... 310/237
2002/0180300 A1 * 12/2002 Inukai et al. ............... 310/233

FOREIGN PATENT DOCUMENTS

DE 31220885 * 12/1982 ........... H01R/39/32
JP 59103545 * 6/1984 ........... H01R/39/32
JP 08065967 * 3/1996 .......... H02K/13/00
JP 08308183 * 12/1996 .......... H02K/13/00
JP 2001268854 * 3/2000 .......... H02K/13/00
JP 2000150100 * 5/2000 ........... H01R/39/06
JP 2001268855 * 9/2001 .......... H02K/13/00
WO WO 99/57797 * 11/1999 .......... H02K/39/08

* cited by examiner

*Primary Examiner*—Nestor Ramirez
*Assistant Examiner*—H. Y. M. Elkassabgi
(74) *Attorney, Agent, or Firm*—Nixon & Vanderhye P.C.

(57) ABSTRACT

A plane commutator includes a plurality of commutator segments made of carbon compound, a resinous boss member and a plurality of metal base plates. The plurality of the commutator segments forms a disk-like commutator surface at an end thereof and a base portion at the other end. The resinous base member is disposed in contact with the base portion to support the plurality of commutator segments. Each commutator segment has a projection extending from the base portion, and each base plate has an expansible through hole fitted to the projection. Each projection includes metal powder at portion in contact with the through hole to provide good electrical connection.

13 Claims, 3 Drawing Sheets

PLANE COMMUTATOR WITH METAL BASE PLATE AND CARBON COMPOUND SEGMENTS HAVING PROJECTIONS

CROSS REFERENCE TO RELATED APPLICATION

The present application is based on and claims priority from Japanese Patent Application 2000-81406 filed Mar. 23, 2000, the contents of which are incorporated herein by reference.

BACKGROUND OF THE INVENTION

1. Field of the Invention

The present invention relates to a plane commutator that has a disk-like commutator surface and a method of manufacturing such a commutator.

2. Description of the Related Art

A plane commutator that has a disk-like flat commutator surface is installed in a motor such as a motor of a motor-integrated fuel-pump unit. The plane commutator is fitted to a rotary shaft of the motor. The plane commutator is comprised of a plurality of commutator segments (generally made of a burnt carbon) insulated by slits from each other, a plurality of metal base plates, and a resinous boss member. The plurality of the commutator surface forms the flat commutator surface. Each of the commutator segments is connected to one of the metal base plates.

There are two types of the plane commutator: the first type has the metal base plate connected to an end of the commutator and the commutator surface formed at the other end of the commutator; and the second type has the metal base plate connected to portions around the same end of the commutator as the commutator surface.

In the first type, it is difficult to mechanically fix the base plates to the commutator due to spring-back force of the base plate. Therefore it is necessary to weld or solder the base plates to the commutator segments while pressing the base plate in the axial direction thereof.

U.S. Pat. No. 5,925,961 or its corresponding Japanese Application, JP-A-10-4653, discloses a method of fixing the base plate to commutator segments of the first type commutator. Each commutator segment has a projection extending in the axial direction from the surface of the commutator opposite the commutator surface. The metal base plate has holes to which the projections are inserted. The holes are thereafter crimped or pressed at the circumference thereof to mechanically fix the base plate to the commutator segments.

However, it is difficult to control the pressing force to provide a desired strength in the disclosed method. If the pressing force is not controlled as desired, the projection may be broken. This is an obstacle to mass-production of the above type of the motors.

SUMMARY OF THE INVENTION

A main object of the invention is to provide an improved motor and a method of manufacturing such a motor.

In a plane commutator according to a preferred embodiment of the invention, a disk-like commutator surface is formed of a plurality of commutator segments at an end thereof and a base portion is formed at the other end, and each commutator segment has a tapering projection. A plurality of metal base plates is respectively connected to the plurality of commutator segments at the base portion. Each base plate has an expansible through hole force-fitted to the tapering projection, and each projection includes metal powder at portion in contact with the through hole.

Therefore, it is easy to control the elastic binding force without using any specific tool, and the projection can be prevented from being broken or damaged.

Preferably, each metal base plate has a tapering sleeve extending from the through hole to be in contact with the projection. The sleeve may have a plurality of slits for providing more suitable elastic contact with the projection.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
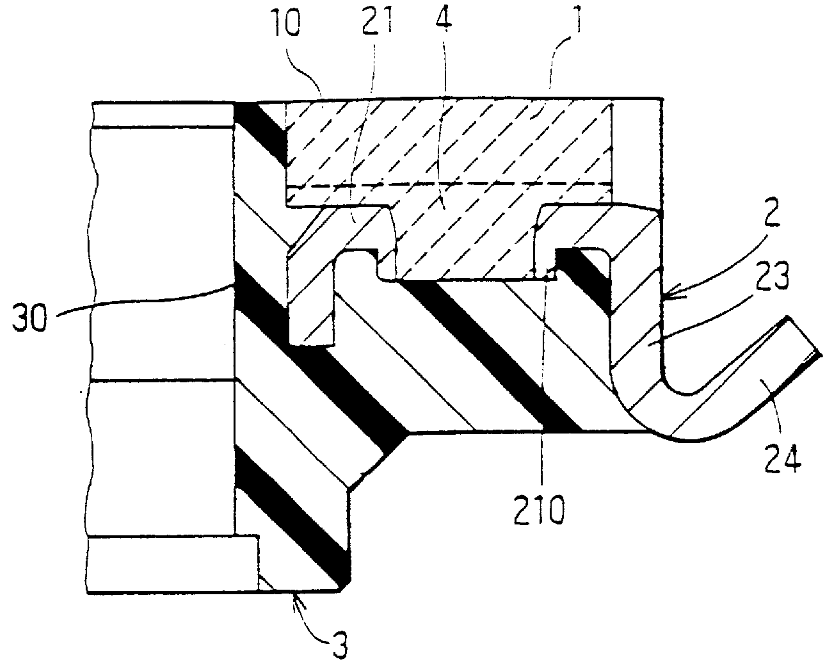
FIG. 1 is a partially cross-sectional view in the axial direction of a commutator according to a first embodiment of the invention.

A plane commutator to be installed into a fuel pump motor according to a first embodiment of the invention is described with reference to FIG. 1.

The plane commutator is comprised of a plurality of radially extending commutator segments 1, a plurality of metal base plates 2 and a boss member 3. The plurality of commutator segments 1 is made of sintered carbon compound and spaced apart from each other to form a disk-like commutator surface at an end thereof.

Each of the base plates 2 has an engagement portion 21, a wall portion 23 and a terminal portion 24. The engagement portion 21 engages a corresponding part of the surface (hereinafter referred to as the back surface) formed at the other end of the plurality of commutator segments 1 behind the commutator surface. The wall portion 23 extends from the engagement portion 21 in the axial direction away from the commutator surface along the outer periphery of the boss member 3. The terminal portion 24 extends aslant to radially outside from the wall portion 23 to connect an end of armature coil by fusion welding or the like.

The boss member 3 is made of a generally disk-like resinous member that has a center shaft hole 30. The boss member 3 closely covers the engagement portions 21 of the base plates 2 except the portions in contact with the commutator segments 1. The boss member 3 also covers the plurality of commutator segments 1 except the commutator surface and side surfaces thereof.

Each of the commutator segments 1 has a projection 4 formed at the back surface to extend downward as shown in FIG. 1. Each of the base plate 2 has an engagement sleeve 210, to which one of the projections 4 is force fitted. The engagement sleeve 210 can be substituted by a through hole. The projections 4 and the inner periphery of the sleeves 210 are slightly tapered off so that the projections 4 can be easily force-fitted to the sleeves 210 and securely held under a uniform compressive force of the sleeve 210. Therefore, the projections 4 are not damaged when they are fitted to the sleeve 210.

The upper surface of the engagement portion 21 is in close contact with the back surface of the commutator segments 1, thereby providing a good electrical contact between the plurality of commutator segments 1 and the plurality of base plates 2. If desired, the plurality of commutator segments 1 and the plurality of base plates 2 are thereafter welded together by heating or pressuring to reduce the electrical resistance. In assembling, each projection of the plurality of commutator segments 1 is fitted to one of sleeves 210 of the plurality of the base plates 2. The plurality of base plates 2 can be formed from a unitary cylindrical member. The plurality of the base plates 2 are separated by a cutter when commutator slits are formed after all the projections are fitted to the sleeves 210.

The plurality of commutators 1 and the plurality of base plates 2 in a unit are set in a metal die to mold with resin. Thus, a unitary member, which is comprised of the boss member 3 covering the engagement portion 21 and the wall portions 23 extending along the outer periphery of the boss member 3, is formed.

Then, a plurality of radial slits is formed in the disk to provide the plurality of commutator segments 1. Finally, lead wires are connected to the terminal portion 24 by fusion welding. The engagement portion 21 is dispersed with a suitable amount of metal powder to prevent the projections from cracking and to reduce the electrical resistance thereof.

Figure 2:
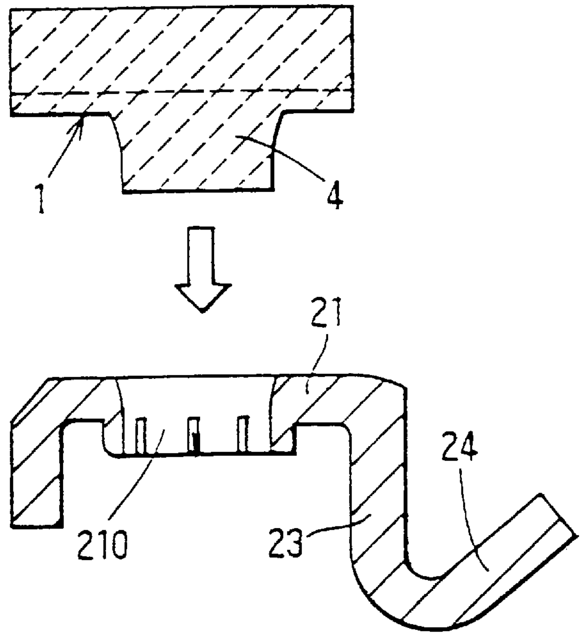
FIG. 2 is an exploded fragmentary cross-sectional view of a commutator according to a second embodiment of the invention.

A plane commutator according to a second embodiment of the invention is described with reference to FIG. 2. In the following figures, the same reference numeral corresponds to the same part or component shown in FIG. 1.

A plurality of longitudinal slits 211 is formed in the sleeves 210 at equal intervals. When each projection 4 is inserted to one of the tapered sleeves 210, the sleeve 210 expands elastically so that the projection 4 and the sleeve 4 are closely in contact with each other. This prevents the metal base plates 2 from falling off the commutator segments 1.

Figure 3:
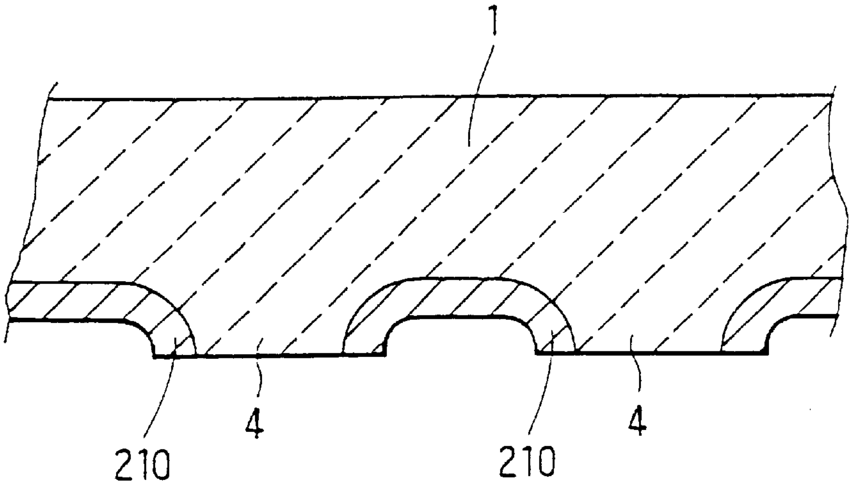
FIG. 3 is a fragmentary cross-sectional view in the axial direction of a commutator according to a third embodiment of the invention.

A plane commutator according to a third embodiment of the invention is described with reference to FIG. 3.

Each commutator segment 1 has two or more projections 4, and each base plate 2 has the corresponding number of shallow sleeves 210. This arrangement can shorten the axial length of the plane commutator.

Figure 4:
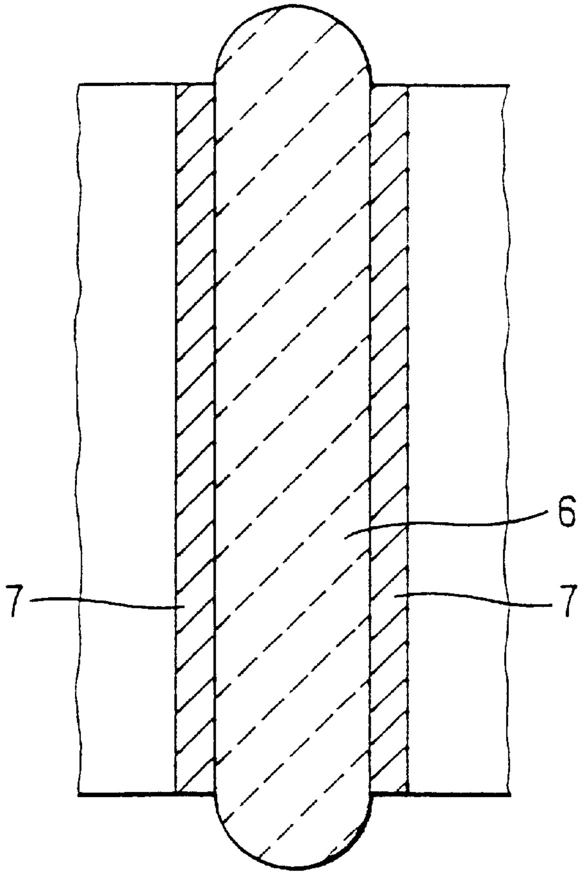
FIG. 4 is a fragmentary cross-sectional view in the radial direction of a commutator according to a fourth embodiment of the invention.
Figure 5:
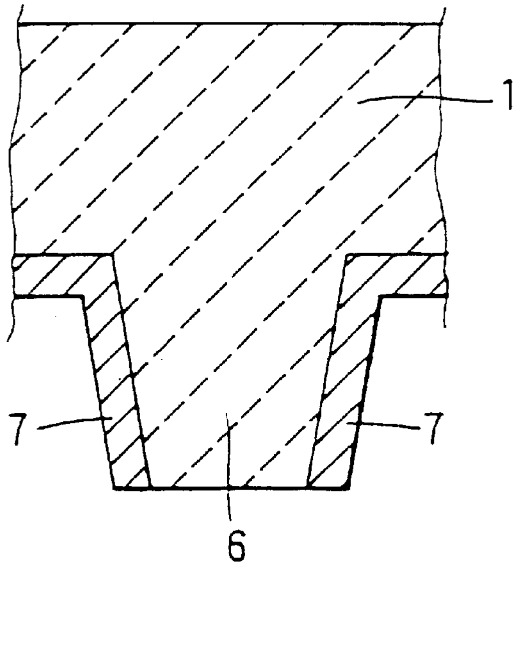
FIG. 5 is a fragmentary cross-sectional view in the axial direction of the commutator according to the fourth embodiment.

A plane commutator according to a fourth embodiment of the invention is described with reference to FIGS. 4 and 5.

The commutator segment 1 has a generally rectangular parallelepiped projection 6 instead of the cylindrical projections 4, and the metal base plate 2 has a pair of parallel walls 7 that sandwiches the projection 6 instead of the sleeve 210. The projection 6 tapers off, and the inside space of the pair of walls 7 also tapers off correspondingly. Therefore, the projection 6 and the pair of walls 7 are securely fitted to each other without concentration of stresses on the projection 6.

In the foregoing description of the present invention, the invention has been disclosed with reference to specific embodiments thereof. It will, however, be evident that various modifications and changes may be made to the specific embodiments of the present invention without departing from the broader scope of the invention as set forth in the appended claims. Accordingly, the description of the present invention is to be regarded in an illustrative, rather than a restrictive, sense.

What is claimed is:

1. A plane commutator comprising:

a plurality of commutator segments made of carbon compound spaced apart from each other having a disk-like commutator surface at an end thereof and a base portion at the other end, each said commutator segments having a projection extending from said base portion;

a resinous boss member disposed in contact with said base portion to support said plurality of commutator segments; and a plurality of metal base plates, each said base plate having an engagement portion in contact with one of said commutator segments, and a terminal portion extending along an outer periphery of said boss member; wherein said engagement portion has an expansible sleeve extending along said projection of one of said commutator segments over a length which is greater than the thickness of said base plate to provide a surface for receiving said projection under pressure, and each of said projections includes metal powder at a portion in contact with one of said through holes.

2. The plane commutator as claimed in claim 1, wherein each of said sleeves has a plurality of slits.

3. The plane commutator as claimed in claim 1, wherein said sleeve includes a portion which tapers off.

4. A plane commutator comprising:

a plurality of commutator segments made of carbon compound spaced apart from each other having a disk-like commutator surface at an end thereof and a base portion at the other end, each said commutator segment having a projection extending from said base portion;

a resinous boss member disposed in contact with said base portion to support said plurality of commutator segments; and a plurality of metal base plates having a thickness, each said base plate having an expansible sleeve extending along said projection of one of said commutators over a length which is greater than the thickness of said base plate to provide a cylindrical surface to be fitted to said projection of one of said commutators and a terminal portion extending along an outer periphery of said boss member; wherein each of said projections includes metal powder at a portion in contact with one of said sleeves.

5. The commutator as claimed in claim 4, wherein each of said sleeves has a plurality of slits.

6. The plane commutator as claimed in claim 4, wherein said sleeve includes a portion which tapers off.

7. A plane commutator comprising:

a plurality of commutator segments made of sintered carbon compound disposed to provide a disk-like commutator surface at an end thereof and a base portion at the other end, each said commutator segments having a projection extending from said base portion;

a resinous boss member disposed in contact with said base portion to support said plurality of commutator segments together at equal intervals; and a plurality of metal base plates, each said base plate having an expansible hollow member extending along said projection over a length which is greater than the thickness of said base plate to be fitted to said projection of one of said commutator segments under pressure and a terminal portion extending along an outer periphery of said boss member; wherein each of said projections includes metal powder at a portion in contact with one of said recess member.

8. The plane commutator as claimed in claim 7, wherein each said expansible hollow member comprises a sleeve.

9. The plane commutator as claimed in claim 8, wherein each said expansible hollow member has a plurality of slits.

10. The plane commutator as claimed in claim 7, wherein each said expansible hollow member comprised a pair of parallel walls.

11. The plane commutator as claimed in claim 7, wherein each said expansible hollow member includes a portion which tapers off.

12. A plane commutator comprising:

a plurality of commutator segments made of carbon compound spaced apart from each other having a disk-like commutator surface at an end thereof and a base portion at the other end, each said commutator segments having a projection extending from said base portion;

a resinous boss member disposed in contact with said base portion to support said plurality of commutator segments; and a plurality of metal base plates, each said base plate having an engagement portion in contact with one of said commutator segments, and a terminal portion extending along an outer periphery of said boss member;

wherein said engagement portion has an expansible sleeve extending along said projection of one of said commutator segments over a length which is greater than the thickness of said base plate to provide a surface for receiving said projection under pressure.

13. A plane commutator comprising:

a plurality of commutator segments made of carbon compound spaced apart from each other having a disk-like commutator surface at an end thereof and a base portion at the other end, each said commutator segment having a projection extending from said base portion; a resinous boss member disposed in contact with said base portion to support said plurality of commutator segments; and a plurality of metal base plates having a thickness, each said base plate having an expansible sleeve extending along said projection of one of said commutators over a length which is greater than the thickness of said base plate to provide a cylindrical surface to be fitted to said projection of one of said commutators and a terminal portion extending along an outer periphery of said boss member.

* * * * *